US011459432B2

(12) United States Patent
Heiskanen et al.

(10) Patent No.: US 11,459,432 B2
(45) Date of Patent: Oct. 4, 2022

(54) METHOD FOR MAKING A FILM COMPRISING MFC

(71) Applicant: Stora Enso OYJ, Helsinki (FI)

(72) Inventors: Isto Heiskanen, Imatra (FI); Kaj Backfolk, Villmanstrand (FI); Esa Saukkonen, Lappeenranta (FI); Ville Ribu, Lappeenranta (FI); Katja Lyytikäinen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 328 days.

(21) Appl. No.: 16/461,897

(22) PCT Filed: Nov. 16, 2017

(86) PCT No.: PCT/IB2017/057166
§ 371 (c)(1),
(2) Date: May 17, 2019

(87) PCT Pub. No.: WO2018/092056
PCT Pub. Date: May 24, 2018

(65) Prior Publication Data
US 2019/0276621 A1   Sep. 12, 2019

(30) Foreign Application Priority Data

Nov. 18, 2016 (SE) .................................. 1651513-2

(51) Int. Cl.
| | |
|---|---|
| *C08J 5/18* | (2006.01) |
| *D21H 11/18* | (2006.01) |
| *D21H 25/04* | (2006.01) |
| *D21H 19/34* | (2006.01) |
| *D21H 13/00* | (2006.01) |
| *D21H 21/18* | (2006.01) |
| *D21H 19/52* | (2006.01) |
| *D21H 21/16* | (2006.01) |
| *D21H 17/28* | (2006.01) |

(52) U.S. Cl.
CPC ............... *C08J 5/18* (2013.01); *D21H 11/18* (2013.01); *D21H 13/00* (2013.01); *D21H 17/28* (2013.01); *D21H 19/34* (2013.01); *D21H 19/52* (2013.01); *D21H 21/16* (2013.01); *D21H 21/18* (2013.01); *D21H 25/04* (2013.01); *C08J 2301/02* (2013.01)

(58) Field of Classification Search
CPC ............ C08J 5/18; D21H 11/18; D21H 25/04
See application file for complete search history.

(56) References Cited

U.S. PATENT DOCUMENTS

| | | | | |
|---|---|---|---|---|
| 4,150,697 | A * | 4/1979 | Dowell .................. | A22C 13/00 138/118.1 |
| 10,576,721 | B2 | 3/2020 | Neagu et al. | |
| 2013/0017349 | A1 | 1/2013 | Heiskanen et al. | |
| 2013/0264007 | A1 | 10/2013 | Noishiki et al. | |
| 2015/0053113 | A1* | 2/2015 | Kim ........................ | C08K 5/45 106/170.43 |
| 2015/0068973 | A1 | 3/2015 | Bessonoff et al. | |

FOREIGN PATENT DOCUMENTS

| | | |
|---|---|---|
| CN | 102695832 A | 9/2012 |
| CN | 103298861 A | 9/2013 |
| CN | 104321131 A | 1/2015 |
| EP | 2759577 | 7/2014 |
| JP | 2010201414 | 9/2010 |
| JP | 2010201414 A * | 9/2010 |
| JP | 2011212569 | 10/2011 |
| JP | 2014095008 A | 5/2014 |
| JP | 2014196114 | 10/2014 |
| JP | 2016160406 A | 9/2016 |
| JP | 2018533499 A | 11/2018 |
| WO | 2009020239 A1 | 2/2009 |
| WO | 2013060934 | 5/2013 |
| WO | 2014044870 | 3/2014 |
| WO | 2015034426 | 3/2015 |
| WO | 2016083674 | 6/2016 |

OTHER PUBLICATIONS

JP 2010-201414, Machine Translated, Sep. 16, 2010. (Year: 2010).*
International Searching Authority, Written Opinion of the International Searching Authority, PCT/IB2017/057166, dated May 24, 2018.
International Searching Authority, International Search Report, PCT/IB2017/057166, dated May 24, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Siro, Istvan et al., "Surface modification of nanofibrillated cellulose films by atmospheric pressure dielectric barrier discharge," Journal of Adhesion Science and Technology, 2013, vol. 27, No. 3, 294-308.
Wolf, Rory A., et al., "Adhesion Improvements of Nanocellulose Composite Interfaces," Plastics Engineering, Jun. 2013.
Kristin Syverud and Per Stenius: "Strength and barrier properties of MFC films", Cellulose, Springer Netherlands, Netherlands, vol. 16, No. 1, Aug. 19, 2008, pp. 75-85.

* cited by examiner

*Primary Examiner* — Leigh C Maier
*Assistant Examiner* — Everett White
(74) *Attorney, Agent, or Firm* — Greer, Burns & Crain, Ltd.

(57) ABSTRACT

Method for making a film that comprises microfibrillated cellulose, wherein the film has low OTR values and especially suitable for a tropical environment. The method comprising the steps of providing a suspension comprising microfibrillated cellulose (MFC), forming a film from said suspension, wherein the film having a solid content above 40%, preferably above 50%, treating the film with flame or plasma treatment, such that a surface activation takes place on the film, and cooling the film, wherein the surface of the film having a decreased OTR value and a high moisture resistance.

17 Claims, No Drawings

METHOD FOR MAKING A FILM COMPRISING MFC

This application is a U.S. National Phase under 35 U.S.C. § 371 of International Application No. PCT/IB2017/057166, filed Nov. 16, 2017, which claims priority under 35 U.S.C. §§ 119 and 365 to Swedish Application No. 1651513-2, filed Nov. 18, 2016.

TECHNICAL FIELD

The present invention relates to a method for making a film comprising microfibrillated cellulose (MFC), wherein the film has low oxygen transmission rate (OTR) values and especially suitable for a tropical environment, i.e. high humidity, above 75%, and high temperatures, 30° C.

BACKGROUND—PROBLEM

MFC films, i.e. films comprising microfibrillated cellulose (MFC) also denoted nanocellulose, have been known to have good strength and high oxygen barrier properties. This has been demonstrated in a vast amount of articles and patents. This is for example described by Syverud, "Strength and barrier properties of MFC films", Cellulose 2009 16:75-85 where MFC films with a basis weight between 15-30 gsm was produced and the strength and barrier properties were investigated.

However, a major problem is to make a free standing MFC film or MFC coating that also provides high gas barrier at tropic conditions (about 38° C. and RH 85%). Some attempts to solve the problem have been described in prior art:

Coat the MFC film with polyethylene (PE) (PE gives high water vapour barrier).
Coat the MFC film with dispersion coating e.g. latex.

Nevertheless, the above solutions are suitable if both sides of the film are laminated or coated with a polymer that provides moisture and water barrier such as PE, etc.

The problem is even more obvious if only one side of the film is coated. For example, if the film is applied on a paperboard, the moisture will diffuse through the paperboard and swell the MFC film and thereby cause a substantial increase in OTR value (reduced gas barrier).

However, the moisture penetration i.e. the OTR deterioration, might take several days. Therefore, in literature, there are cases where the sample has not been stabilized long enough. Hence, these results don't give a fair picture of the real case.

OBJECT OF INVENTION

An object with the present invention is to manufacture a MFC film especially suitable for a tropical environment, and wherein the film has good OTR properties at tropical conditions and excellent OTR properties at normal conditions and does not involve the above mentioned problems.

SUMMARY OF THE INVENTION

The inventive method comprising the following steps:
providing a suspension comprising microfibrillated cellulose (MFC),
forming a film from said suspension, wherein the film having a solid content above 40%, preferably above 50%,
heating the film quickly with flame treatment or plasma treatment, such that a surface activation takes place on the film, and
cooling the film, wherein the surface of the film having a decreased OTR value and a high moisture resistance.

DETAILED DESCRIPTION OF THE INVENTION

An MFC film in this context is meant a thin substrate with good gas, aroma, grease or oil barrier properties, preferably the film has good oxygen barrier properties. The film has a basis weight of less than 40 g/m$^2$ and a density in the range from 700-1400 kg/m$^3$, although it is not limited to this. The oxygen transmission rate (OTR) value of a film having a grammage of 30 g/m$^2$ at a relative humidity of 50% and temperature 23° C., is preferably below 30 cc/m$^2$*day*atm according to ASTM D-3985. The content of microfibrillated cellulose in the MFC film is at least 50 wt % (weight %), preferably above 70 wt % and most preferred above 90 wt %, as calculated on the total weight of the dried film.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 m$^2$/g, such as from 1 to 200 m$^2$/g, or more preferably 50-200 m2/g when determined for a freeze-dried material with the BET method.

Various methods exist to make MFC, such as single or multiple pass refining, pre-treatment followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemi-mechanical pulps. It can also be made from broke or recycled paper.

The above described definition of MFC includes, but is not limited to, the new proposed TAPPI standard W13021 on cellulose nanofibril (CMF) defining a cellulose nanofiber material containing multiple elementary fibrils with both crystalline and amorphous regions, having a high aspect ratio with width of 5-30 nm and aspect ratio usually greater than 50.

The invention is a new inventive method to manufacture a thin MFC film (a thin film comprising microfibrillated cellulose), wherein above mentioned problems concerning moisture sensitivity at tropical conditions will be fully or at least partly solved.

It has surprisingly been found that a quick heat treatment of the MFC film followed by a cooling step improves the OTR barrier and has good OTR barrier even at tropical conditions. A quick heat treatment is in this context a heat treatment at high temperature, wherein the heating time is less than 10 s, preferably less than 6 s and most preferred less than 3 s. The quick heat treatment may be performed by either "flame treatment" or "plasma treatment", see below.

The thin MFC film, to be heat treated, is manufactured from a suspension comprising microfibrillated cellulose. There are several techniques to form a thin MFC film. Three preferred techniques are "wire forming", "cast forming", and "cast coating"

Wire Forming (or Wet Laid)

In this technique a suspension, comprising microfibrillated cellulose, is dewatered on a porous surface to form a fibrous web. A suitable porous surface is e.g. wire in a paper machine. The fibrous web is then dried in a drying section in a paper machine to form the MFC film, wherein the film has a first side and a second side.

Cast Forming

In this technique the suspension, comprising MFC, is applied on a supporting medium with a non-porous surface. The non-porous surface is e.g. a plastic or metal belt on which the suspension is evenly spread and the MFC film is formed during drying. The MFC film is then peeled off from the supporting medium in order to form a stand-alone film, wherein the film has a first side and a second side. WO2013/060934 discloses cast forming more in detail.

Cast Coating

In this technique the suspension, comprising MFC, is applied on a supporting medium as a coating layer on the substrate. The supporting medium is e.g. a paper, a paperboard, a plastic or a polymer substrate on which the suspension is evenly spread and the MFC film is formed during drying. The formed MFC film is then left on the supporting medium as a coating layer. The coating or coating layer may be provided to the substrate by any conventional coating techniques known in the art. These include for instance cast coating, roll coating, spray coating, foam coating, printing and screening techniques, blade coating, film press, surface sizing, curtain coating, rotogravure, reverse gravure and kiss coater.

The MFC film, manufactured by any one of the three preferred techniques above (wire forming, cast forming and cast coating), has a first side and a second side, which second side faces away from the first side. Before the film is rapid heat treated it has a solid content above 40%, preferably above 50%.

The quick heat treatment of the film is performed with a flame or plasma treatment equipment, wherein the flame or plasma heats the film at a short time. See Example 1 below, which discloses a preferred embodiment with flame treatment.

We believe that the heat treatment techniques above creates an activation of the surface of the film. Reactive carbonyl groups and radicals are created by the heat activation induced by the heat. These reactive carbonyl groups and radicals can form autocross-linking of the MFC film surface in the subsequent cooling step.

By a cooling step is meant that the film is actively cooled down, or that it is kept at a storage temperature of 40° C. or less. By actively cooling is meant that the film is in contact with a cooling element such as a chill roll/cylinder or metal belt preferably in combination with one or several nips, wherein the load pressure is in the range 0-100 kN/m Forced air cooling is another possible cooling method. However, the skilled person realizes that other types of cooling equipment and methods may be used.

The temperature of the MFC film after the cooling step is less than 70° C., preferably less than 60° C. and most preferred less than 40° C.

Example—Flame Treatment

Trials were conducted on a pilot paper machine with running speed of 15 m/min and 9 m/min to produce a MFC film from softwood (A) and hardwood (B) kraft pulp, respectively. In addition to MFC, process and performance chemicals comprising wet-end starch, cationic polysaccharide, silica, bentonite and wet-strength chemical was used. In addition, hydrophobic sizing agent AKD was applied into the wet end. Table 1 summarizes the test points and their Oxygen Transmission Rates (OTR).

TABLE 1

| | Test Points | |
|---|---|---|
| Fiber source, % | A<br>MFC made from softwood | B<br>MFC made from hardwood |
| Grammage, g/m$^2$ | 30.8 | 27.4 |
| OTR, cc/(m$^2$-day) * | 221 | 280 |

* determined at 85% RH, 38° C.

The MFC films A and B produced on a pilot paper machine were treated with flame then cooled by contacting the samples with a chill roll. Variables in the trial were machine line speed (m/min), pressure in the chill roll nip (bar), and flame intensity (i.e. flame power). Trial conditions are shown in Table 2.

TABLE 2

Trial conditions

| | | | | MFC film web temperature [° C.] | | | |
|---|---|---|---|---|---|---|---|
| Trial test point | Speed [m/min] | Chill roll nip pressure [bar] | Power* | under flame | before chill roll nip | after contact with chill roll | Time between flame activation and contact with chill roll [s] |
| C1 | 40 | 2.5 | 1 | 180 | 115 | 21 | 1.2 |
| C2 | 100 | 2.5 | 2 | 150 | 106 | 22 | 0.48 |
| C3 | 200 | 2.5 | 2 | 120 | 75 | 23 | 0.24 |
| C4 | 100 | 4 | 1 | 140 | 90 | 20 | 0.48 |
| C5 | 200 | 4 | 1 | 115 | 65 | 22 | 0.24 |
| C6 | 100 | 4 | 2 | 150 | 106 | 22 | 0.48 |
| C7 | 200 | 4 | 2 | 120 | 75 | 23 | 0.24 |
| C8 | 40 | 5.5 | 1 | 180 | 115 | 21 | 1.2 |

*Power1 = Air flow 400 l/min, air ratio 24:1, Power2 = Air flow 600 l/min, air ratio 25:1

The results of the trials carried out are disclosed in Table 3 where the measured Oxygen transmission rates (OTR) for the treated samples is disclosed. In order to evaluate the effect of the flame activation of the MFC films on OTR a high relative humidity (RH), the non-treated MFC films A and B were extrusion PE-coated with 25 g/m$^2$ of LDPE (CA7230). Measurements were made in 85% relative humidity (RH) and 38° C. temperature after conditioning the samples to equilibrium moisture content in the same conditions.

TABLE 3

| Trial results for OTR value at 38° C., 85% RH | | | | | | | | | | | |
|---|---|---|---|---|---|---|---|---|---|---|---|
| | ref B | ref A | C1 B | C1 A | C2 B | C2 A | C3 B | C3 A | C4 B | C4 A | C5 B |
| OTR [cc/m$^2$-24 h]* | 280 | 221 | 164 | 130 | 189 | 205 | 169 | 110 | 160 | 147 | 52 |
| | C5 A | C6 B | C6 A | C7 B | C7 A | C8 B | C8 A | LDPE B | LDPE A | | |
| | 135 | 135 | 1000 | 1000 | 134 | 1000 | 134 | 148 | 104 | | |

*determined at 85% RH, 38° C.

With flame activation and subsequent cooling (contact with chill roll) of the MFC film the OTR level in tropical conditions (85% RH, 38° C.) of the MFC film can be decreased to approximately same level or even to a lower level than with non-treated PE-coated MFC film.

Cast formed and cast coated MFC film can be treated similarly as films given in the example.

In the foregoing, the invention has been described on the basis of some specific embodiments. It is appreciated, however, that other embodiments and variants are possible within the scope of the following claims:

For example the active cooling may be performed with different type of chill elements than chill roll.

As mentioned above, the skilled person realises that the cooling step also can be performed in different ways, e.g. by letting the MFC film cool in a storage at room temperature (i.e. at a storage at a temperature below 40° C.). Performed tests shows that the MFC film may be cooled down in a storage at room temperature has a positive effect on the OTR value after the quick heat treatment, in accordance with the invention. Hence, the time to cool the MFC film after the heating step seems to be less crucial for the result. Therefore, the skilled person realises that several different cooling techniques may be used.

Moreover, the skilled person realises that other quick heat treatments are possible, than flame treatment, such that a surface activation takes place on the film. The skilled person knows that e.g. plasma treatment of the MFC film is also would be an equivalent embodiment to flame treatment.

The forming of the MFC film is not limited to "wire forming", "cast forming" and "cast coating". Also other possible methods exist known in literature and by skilled persons such as various transfer coatings, spray and other non-coating methods.

The invention claimed is:
1. Method for making a film comprising microfibrillated cellulose (MFC), wherein the film is especially suitable for a tropical environment, the method comprising the steps of:
  providing a suspension comprising microfibrillated cellulose (MFC), forming a film from said suspension, wherein the film has a solid content above 40% and wherein the content of microfibrillated cellulose in the MFC film is at least 90 wt %, as calculated on the total weight of the dried film, heating the film quickly with flame treatment or plasma treatment, such that a surface activation takes place on the film, wherein the heat treatment of the film is shorter than 10 s, and cooling the film to form a treated film, wherein the surface of the treated film has a decreased low oxygen transmission rate (OTR) value and a higher moisture resistance relative to the film before the flame treatment or plasma treatment.

2. Method according to claim 1, wherein the cooling step is performed by placing the film in a storage below 40° C.

3. Method according to claim 1, wherein the cooling step is performed by placing the film on at least one chilling element.

4. Method according to claim 3, wherein the cooling step is performed by placing the film in a chill roll nip.

5. Method according to claim 4, wherein the line pressure in the nip is in the range 0-100 kN/m.

6. Method according to claim 1, wherein the time between the heat treatment and the cooling is less than 2 s.

7. Method according to claim 1, wherein the MFC film web temperature during the heat treatment is in the range 80-200° C.

8. Method according to claim 1, wherein that the MFC film web temperature after the cooling step is below 35° C.

9. Method according to claim 1, wherein the film after the cooling step has a moisture content <15%, and wherein the film has a basis weight of less than 40 g/m$^2$.

10. Method according to claim 1, wherein the cooling step is performed by placing the film on a chill roll.

11. Method according to claim 1, wherein the time between the heat treatment and the cooling is less than 1 s.

12. Method according to claim 1, wherein the time between the heat treatment and the cooling is less than 0.5 s.

13. Method according to claim 1, wherein the heat treatment of the film is shorter than 6 s.

14. Method according to claim 1, wherein the heat treatment of the film is shorter than 3 s.

15. Method according to claim 1 wherein the film after the cooling step has a moisture content <10%, and wherein the film has a basis weight of less than 40 g/m$^2$.

16. A film comprising microfibrillated cellulose, wherein the film is made in accordance with claim 1.

17. Method for making a film comprising microfibrillated cellulose (MFC), wherein the film is especially suitable for a tropical environment, the method comprising the steps of:

providing a suspension comprising microfibrillated cellulose (MFC), forming a film from said suspension, wherein the film has a solid content above 40% and a basis weight of less than 40 g/m$^2$, heating the film quickly with flame treatment or plasma treatment, such that a surface activation takes place on the film, wherein the heat treatment of the film is shorter than 10 s, and cooling the film to a temperature of less than 70° C. to provide a treated film, wherein the time between the heat treatment and the cooling is less than 2 s and the surface of the treated film has a decreased low oxygen transmission rate (OTR) value and a higher moisture resistance relative to the film before the flame treatment or plasma treatment.

* * * * *